United States Patent [19]

Insolio

[11] 4,203,209

[45] May 20, 1980

[54] ATTACHMENT FOR HAND GLASS CUTTER

[75] Inventor: Thomas A. Insolio, Bristol, Conn.

[73] Assignee: The Fletcher-Terry Company, Farmington, Conn.

[21] Appl. No.: 1,917

[22] Filed: Jan. 8, 1979

[51] Int. Cl.² .............................................. C03B 33/10
[52] U.S. Cl. ................................................. 30/164.95
[58] Field of Search ...................... 30/164.95, 232, 298, 30/340

[56] References Cited

U.S. PATENT DOCUMENTS 4,040,182  8/1977  O'Dell .............................. 30/164.95

*Primary Examiner*—Jimmy C. Peters
*Attorney, Agent, or Firm*—McCormick, Paulding & Huber

[57] ABSTRACT

An attachment for a glass cutter has a curved palm contacting portion and an integrally formed sleeve which is tapered to receive the flared finger receiving lower portion of the handle. A self spring is defined in the sleeve side wall to secure the attachment to the handle.

4 Claims, 6 Drawing Figures

U.S. Patent May 20, 1980 4,203,209
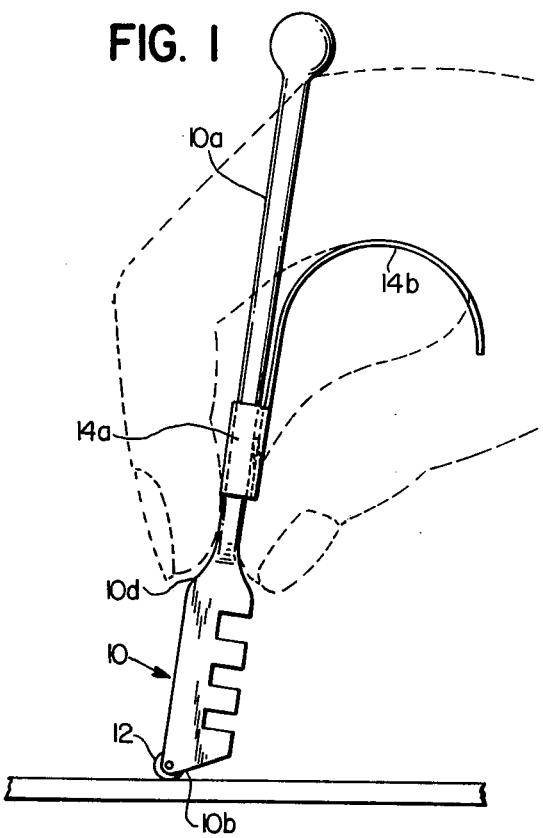
FIG. 1
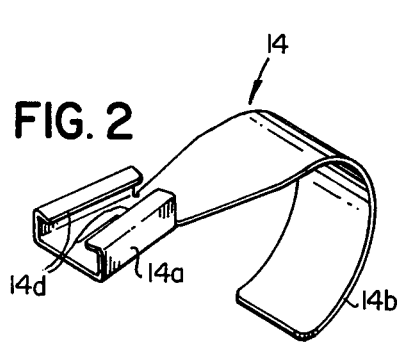
FIG. 2
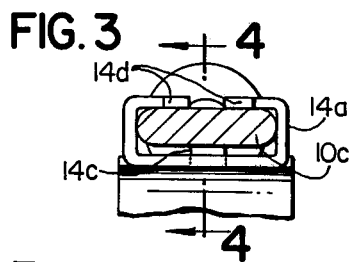
FIG. 3
FIG. 4
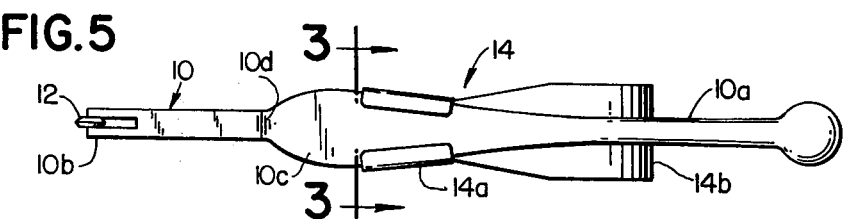
FIG. 5
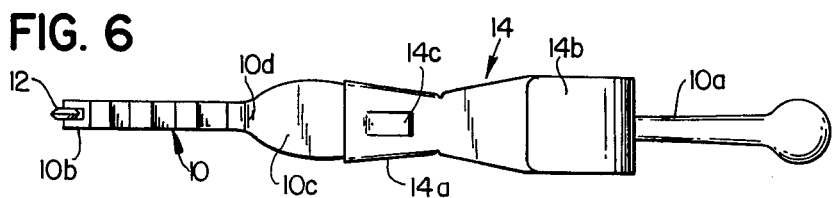
FIG. 6

ATTACHMENT FOR HAND GLASS CUTTER

BACKGROUND OF INVENTION

Craftsmen have used various devices to assist them in holding such glass cutters, and typical of the patented prior art in this field are U.S. Pat. No. 2,892,291 issued to Coleman in 1959, and U.S. Pat. No. 4,040,182 issued to O'Dell in 1977.

The Coleman holder provides an improved cradle for the thumb and forefinger, whereas the O'Dell holder provides a curved auxiliary handle for engagement by the user's palm. The O'Dell holder requires two parts, a sleeve plus the curved palm contacting member, and is therefor quite expensive to manufacture, and difficult for the consumer to assemble properly. The Coleman holder is of one piece, but has no palm contacting means.

SUMMARY OF INVENTION

This invention relates generally to hand held glass cutters, and deals more particularly with an improved attachment for the handle of such a glass cutter to permit the user to more easily exert the necessary downward force on the glass for proper scoring.

Conventional glass cutters generally have a flared portion adjacent the lower end of the handle, which handle tapers in width to form a lower generally rectangular cross section to a narrower generally cylindrical upper portion. In use, the operator squeezes the lower flared portion between his thumb and index, or forefinger, with the handle cradled between his forefinger and his index finger.

The chief aim of the present invention is to provide a one-piece holder, or attachment, for a glass cutter such that the palm of the user's hand can be used to apply at least some downward pressure on the glass cutter, while the thumb and index or forefinger can still be used to grip the lower handle portion in a conventional fashion.

Another object of the present invention is to provide a palm contacting type holder with an integrally formed sleeve, including an integral spring, to securely attach the holder to the handle of a glass cutter.

The attachment configuration which best achieves these objects for use with a conventional glass cutter is of one-piece bent metal construction, having an upper palm contacting portion integrally connected to a lower sleeve defining portion. The latter is adapted to be snugly received on the lower tapered portion of the glass cutter handle and has an open side to receive the upper end of the handle. The sleeve portion is U-shaped with flanges on the open side to engage the lower handle portion, and the closed side, or base of the U, defines a leaf spring integrally formed from this base side to squeeze this lower handle portion against these flanges. The upper portion of the attachment is integrally connected to this base side of the U-shaped sleeve and curves outwardly away from the handle, that is to the opposite side of this base side as the U-shaped sleeve portion. This configuration provides a one-piece holder.

BRIEF DESCRIPTION OF DRAWINGS

FIG. 1 is an elevational view of a glass cutter equipped with an attachment of the present invention, and also shows a glass sheet being scored plus a hand, in broken lines, to illustrate the preferred grip.

FIG. 2 is a perspective view of the attachment of FIG. 1.

FIG. 3 is a sectional view taken on line 3—3 of FIG. 5.

FIG. 4 is a sectional view taken on line 4—4 of FIG. 3.

FIG. 5 is a front view of the glass cutter and attachment of FIG. 1.

FIG. 6 is a rear view of the glass cutter and attachment of FIGS. 1 and 5.

DETAILED DESCRIPTION

A conventional hand held glass cutter 10 includes an elongated handle 10a, a bifurcated lower head 10b for rotatably supporting a glass scoring wheel 12, and a flared portion 10c which is of generally rectangular tapered cross section, and squeezed between the thumb and forefinger (or index finger) during the glass scoring operation.

Considerable downward force is required through this squeezing action, and the upper end of the head 10d is generally thicker than the flared portion 10c so that the user will have some resistance to the natural tendency for his finger and thumb to slide downwardly due to this downward force. The Coleman U.S. Pat. No. 2,892,291 illustrates one solution to this problem, namely to provide larger areas on a holder to resist this propensity for the user's finger and thumb to slide downwardly.

O'Dell U.S. Pat. No. 4,040,182 shows still another solution to this problem, with an arcuately shaped palm engaging member to allow the necessary downward force to be applied by the palm of the user's hand. However, the O'Dell holder requires that a sleeve be used to clamp the palm engaging member to the holder handle. By contrast, the holder 14 of FIG. 2 has a sleeve defining lower portion 14a which is tapered to snugly receive the flared portion 10c of the handle as shown in FIG. 5. This sleeve portion 14a is integrally connected to the cantilevered end 14b which is shaped to contact the palm of the user's hand. These portions 14a and 14b are preferably formed from a single strip of sheet metal, such as steel.

The flared handle 10c has a width approximately equal to that of the sleeve portion 14a, and a thickness somewhat less than the depth of the sleeve portion as shown in FIGS. 3 and 4. A leaf spring 14c is formed in the base side of the sleeve portion 14a, to urge the handle 10c toward flanges 14d, 14d forming the opposite, or open side of the sleeve portion 14a. The sleeve portion 14a is thus generally U-shaped, with the open side being adapted to receive the upper end 10a of the handle during assembly.

The base side of the U-shaped sleeve portion 14a is integrally connected to the upwardly and outwardly curved palm contacting portion 14b, and it is an important feature of the present invention that this arcuately curved upper portion 14b is disposed oppositely to the U-shaped sleeve 14a. This configuration permits the holder attachment 14 to be easily assembled with the glass cutter 10 by fitting the sleeve on the upper handle 10a and sliding the holder downwardly so that the tapered sleeve 14a fits snugly over the lower, tapered handle portion 10c.

I claim:

1. An attachment for use with a glass cutter of the type having an upwardly extending handle with a flattened lower finger engageable portion of generally tapered rectangular cross section, which lower handle portion is so tapered that the wider cross section is toward the lower end of the handle, said attachment comprising a one-piece formed member having a lower sleeve defining portion with side walls defining a tapered sleeve opening to snugly receive said tapered handle portion, said tapered sleeve opening having a front side which is open and defined only by flanges integrally formed on said side walls to define a front opening to receive the smaller upper end of the handle during assembly, said one-piece member having an upwardly extending portion formed by an integral extension of a rear side of said sleeve defining portion, and said upwardly extending portion having a cantilevered free end portion curving away from the handle to which said member is adapted to be attached, said curving free end portion shaped to contact the palm of a user gripping the glass cutter in such a manner that one of his fingers abuts the wider cross sectional portion of the handle adjacent the lower end thereof whereby the glass cutter is more comfortable and secure in his hand during use.

2. The attachment for a glass cutter as defined in claim 1 wherein said lower sleeve portion of said attachment has a depth, front to rear, slightly greater than the thickness of the tapered lower handle portion adapted to be received therein, and wherein said rear side of said sleeve portion defines an integral spring element for resiliently engaging the lower handle portion.

3. The attachment for a glass cutter as defined in claim 2 wherein said integral spring element is defined by a generally U-shaped cut in said rear side of the sleeve portion, said spring element having a free end adjacent the base of the U-shaped cut, said free end of said integral spring being bent toward said front sleeve side and defining an edge which is adapted to engage and to bias the handle toward the flanges and thereby secure the attachment to the glass cutter handle.

4. The attachment for a glass cutter as defined in claim 1 wherein said one piece member is formed from steel, and wherein said sleeve portion defines a self spring adapted to engage the handle to hold the attachment securely to the handle.

* * * * *